June 20, 1967 L. W. LESSLER 3,326,489

DUAL REEL SPINDLE

Filed Jan. 7, 1966 2 Sheets-Sheet 1

INVENTOR.
LEW W. LESSLER

BY James and Franklin
ATTORNEY

INVENTOR.
LEW W. LESSLER
BY James and Franklin
ATTORNEY 3,326,489

DUAL REEL SPINDLE

Lew W. Lessler, Elmhurst, N.Y., assignor to De Jur-Amsco Corporation, Long Island City, N.Y., a corporation of New York Filed Jan. 7, 1966, Ser. No. 519,222

9 Claims. (Cl. 242—68.3)

ABSTRACT OF THE DISCLOSURE

The invention is a reel spindle to be used in a home motion picture projector capable of handling both the standard 8 mm. film and the new Super 8 mm. film. The reel for the Super 8 mm. film has a larger center hole than the reel for the standard 8 mm. film. The new spindle receives either of the two hole diameters, it having a shaft of the smaller diameter, a retainer at its free end to hold a reel on the spindle, a bushing of larger diameter slidable on the shaft, and a spring mounted on the spindle and urging the bushing toward the retainer means. A reel having the small diameter hole pushes the bushing out of the way, whereas a reel having the larger diameter hole is received over the bushing. Either reel is keyed for rotation with the spindle.

This invention relates to reel spindles, especially for home motion picture projectors, and more particularly to a spindle for use with reels having differently sized center holes.

The standard 8 mm. motion picture film for home "movie" projectors has been in use for many years, but a new "Super 8 mm." film has now been marketed. The reels designed for the new film have a larger hole size, to be received on a spindle of larger diameter. A dual purpose projector must be able to accept either type of reel, and the general object of the present invention is to provide a spindle adapted to receive either reel.

A more particular object is to provide a spindle which adapts itself to either reel without requiring any mechanical knowledge or aptitude on the part of the user, who indeed may be unconscious of the difference in the reels.

To accomplish the foregoing general objects and other more specific objects which will hereinafter appear, my invention resides in the dual reel spindle and the elements thereof and their relation one to another, as are hereinafter more particularly described in the following specification. The specification is accompanied by drawings in which.

Figure 1:
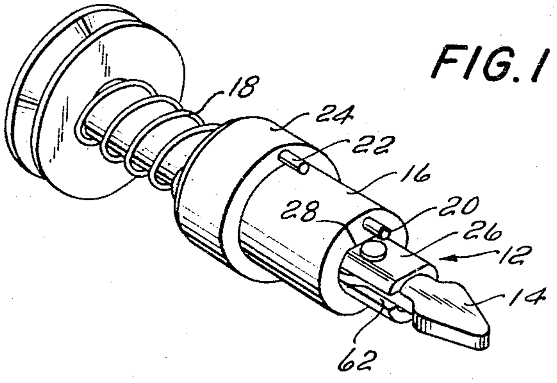
FIG. 1 is a perspective view showing a dual reel spindle embodying features of the invention.

Referring to the drawing, and more particularly to FIG. 1, the dual reel spindle comprises a main shaft 12 of small diameter, with retainer means 14 at its free end to hold a reel on the spindle, a bushing 16 of larger diameter slidable on the shaft 12, and a spring 18 urging the bushing 16 outward or toward the retainer means 14, but affording retraction of the bushing when pushed inward by a reel having a small hole diameter. The spindle additionally has means to key either reel to the spindle. In the present case the outer end of the bushing 16 has a projecting pin 20 to key a reel having a small hole, that is one mating with the shaft 12. The inner end of the bushing 16 has a key 22 to key a reel having a larger hole, that is, one received on and mating with the bushing 16. As here illustrated the key 22 is a pin projecting from a collar or enlarged portion 24, which collar limits the axial movement of a reel slid on the bushing 16.

The bushing 16 is itself keyed on the shaft 12, and in the present case the shaft has a non-circular configuration, as by giving it a flat 26, and the bushing 16 has a mating non-circular configuration, it having a flat at 28, thereby keying the bushing to the shaft without interfering with axial sliding of the bushing on the shaft.

Figures 5, 6:
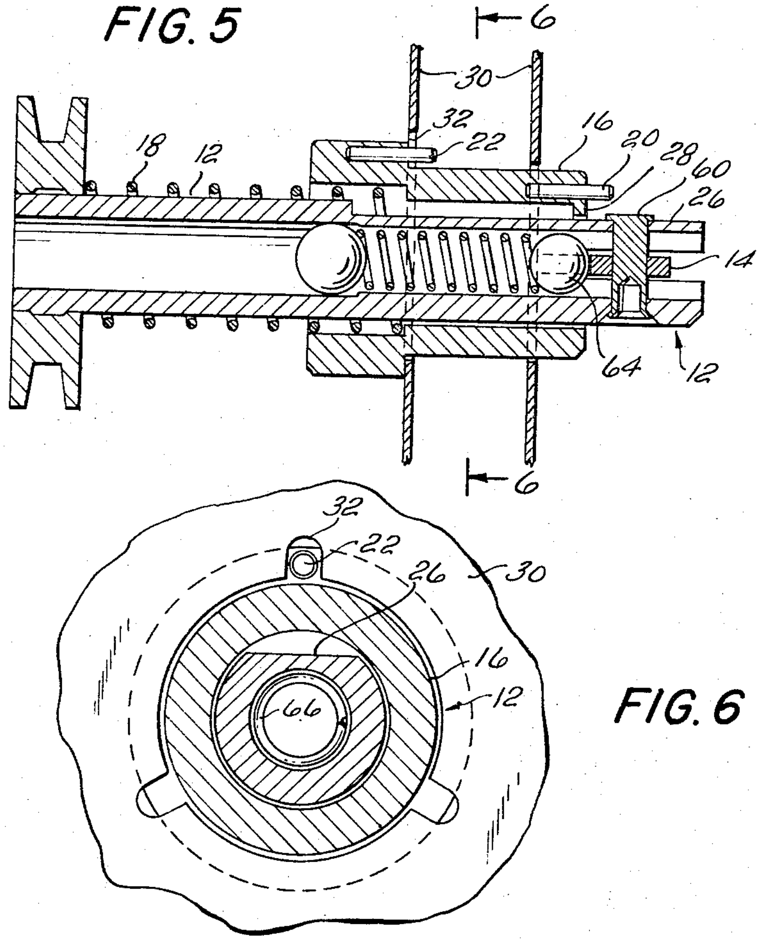
FIG. 5 is a section like FIG. 2, but showing the relation of the parts when receiving a reel having a large center hole.
FIG. 6 is a transverse section taken on the line 6—6 of FIG. 5.

FIGS. 5 and 6 show a modern reel 30 for the new Super 8 mm. film applied to the bushing 16. The reel is simply slid over the bushing, and one of its key slots 32 is received on the pin 22. The bushing is in its advanced or forward position, under influence of spring 18, and the reel is held on the bushing in conventional fashion by turning detent lever 14 transversely of the spindle.

Figure 2:
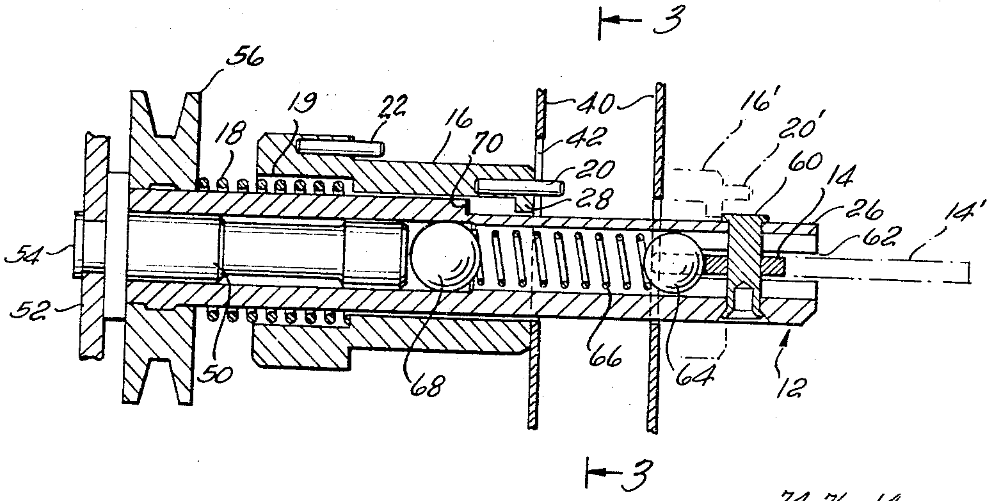
FIG. 2 is a longitudinal section through the spindle when receiving a reel having a small hole.
Figure 3:
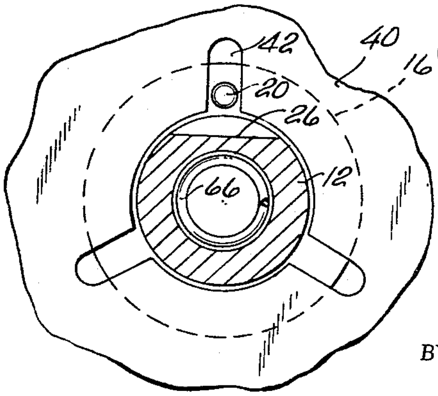
FIG. 3 is a transverse section taken approximately on the line 3—3 of FIG. 2.

The relation of the parts shown in FIGS. 5 and 6 may be contrasted with that shown in FIGS. 2 and 3. In the latter the reel 40 is an older reel which carries standard 8 mm. film. It has a smaller center hole. When slid over the end of shaft 12, the center hole mates with the shaft 12 and is smaller than the bushing 16. The reel pushes the bushing back along the shaft, and the retainer lever again is turned from the axial position shown in broken lines at 14' to the transverse or locking position 14, shown in solid lines. The necessary movement of the bushing 16 is readily accommodated by compression of the spring 18. The reel is keyed by the pin 20 which is received in one of the key slots 42 of the reel.

The spindle assembly in the form here shown is rotatable on a stationary stub shaft 50, this being fixed on a mounting plate or arm 52, as by means indicated at 54. The rotatable shaft 12 is hollow and is freely rotatable on the stub shaft 50. The hollow shaft 12 usually carries a pulley 56 which is driven by a somewhat resilient slip belt (not shown) which accommodates the change in relative diameters as the film moves from one reel and is wound on the other reel. The pulley may be received between the side walls of a hollow reel support arm or housing. This prevents movement of the spindle off the stub shaft, and the pulley may be centered between the walls of the housing by the action of the belt itself.

Figure 4:
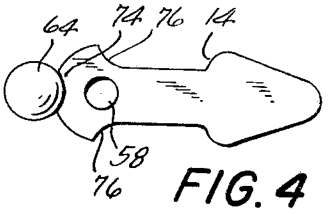
FIG. 4 shows the retainer lever.

The retainer lever 14 may be of conventional construction. It is shown in FIG. 4 with its pivot hole 58. Referring to FIG. 2, pivot 60 is a flare rivet passing diametrically through shaft 12, the end of the latter being slotted on both sides as shown at 62 (FIG. 1) to accommodate turning of the lever to transverse position. The lever is held in either axial position or transverse position by appropriate detent mechanism which, in the present case comprises a detent ball 64 pressed by a spring 66. The spring is anchored at its rear end by means of a fixed ball 68 which is driven into position with a force fit in the hollow shaft 12.

In FIG. 2 it will be seen that the flat 26 on shaft 12 extends for a substantial distance but terminates at a shoulder 70, so that the rear half of the shaft is round. The mating hole through the bushing 16 is circular except at the forward end where a lip 28 makes the hole non-circular and rides on the flat 26 to insure rotation of bushing 16 with shaft 12, without however interfering with the desired sliding movement of the bushing on the shaft. The rear portion of the bushing may be counterbored at 19 to provide clearance for part of the spring 18, so that the spring may be of adequate length without unduly increasing the spacing between the pulley 56 and the bushing 16.

FIG. 2 also shows how the head of flare rivet 60 serves another purpose in limiting the outward movement of the bushing 16. This is shown by the broken line position 16′, 20′ of the bushing.

In FIG. 5 the bushing 16 is shown spaced slightly from the rivet 60. This may occur when the retainer lever 14 is turned to transverse position, as determined by the detent ball 64 and spring 66. The lever may be designed to turn somewhat more than ninety degrees.

It will be understood from inspection of FIG. 4 that the detent ball 64 enters the end recess 74 of lever 14 when the lever is in the axial or loading position shown in FIG. 1. When the lever is turned in either direction to transverse position, the ball bears against either of the detent surfaces 76, which determines the transverse position of the lever, and that in turn determines the axial position of the reel on the spindle.

Figure 7:
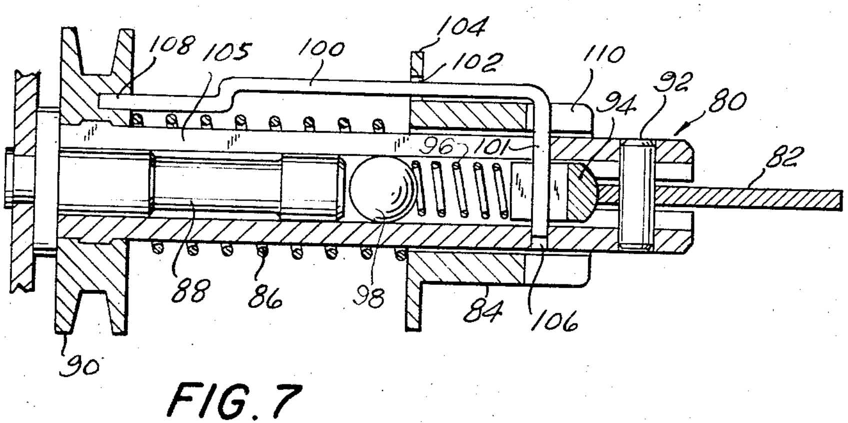
FIG. 7 is a longitudinal section showing a modified form of the invention.

A modified form of the invention is shown in FIG. 7 of the drawing. Here again there is a main shaft 80 of small diameter, a retainer means 82 at its free end to hold a reel on the spindle, a bushing 84 of larger diameter slidable on the shaft 80, and a spring 86 urging the bushing toward the retainer means but affording retraction when pushed inward by a reel having a small diameter hole. The spindle is rotatable on a fixed stub shaft 88 by means of a pulley 90, as previously described. The lever 82 is pivoted on a pin 92 and is fixed in either axial or transverse position by means of a rounded detent 94 urged toward the lever by a compression spring 96, the rear end of which is anchored by means of a ball 98 driven into position in the hollow shaft, much as previously described.

The reel is keyed to the spindle by means of a wire 100 which extends longitudinally of the spindle at a radius suited to receive the key slot of reels having either diameter hole. The wire 100 is disposed at a radius which is just outside the bushing 84, and the latter is axially slidable relative to both the wire 100 and the shaft 80. For this purpose the wire may pass through a hole 102 in flange 104 of the bushing.

It so happens that the key slots in the older reels have a substantial depth, as shown in FIG. 3, exceeding the diameter of the bushing needed for the new reels, and therefore the same key wire 100 may be used to key either reel.

To facilitate assembly the main shaft 80 may be longitudinally slotted as shown at 105. The outer end of the wire is bent transversely at 101 and received in a hole 106, and the inner end of the wire is anchored in the pulley 90 as shown at 108. The outer end of the bushing 84 may be slotted at 110, permitting the bushing to move out further than the end of the key wire 100. The detent 94 may be slotted or bifurcated to straddle the key wire at 101. It should be understood that the long slot 105 is not needed or used in the operation of the spindle. It is provided merely as a means to facilitate assembly of the parts shown during manufacture of the spindle.

It will be understood that with this arrangement, as in that shown in FIG. 2, when a reel for standard 8 mm. film is applied to the spindle the bushing 84 is pushed back out of the way. When a reel for the new Super 8 mm. film is applied to the spindle it slides onto the bushing instead of the shaft, the bushing then remaining in forward position. The final position of either reel is determined by the retainer lever 82 when turned to its transverse or locking postion.

It is believed that the construction and operation of my improved dual reel spindle, as well as the advantages thereof, will be apparent from the foregoing detailed description. The spindle automatically adapts itself to either type of reel, without any special knowledge or manipulation on the part of the user. The bushing is always present when needed, and moves out of the way when not needed.

It will be apparent that while I have shown and described the improvement in several preferred forms, changes may be made without departing from the scope of the invention, as sought to be defined in the following claims.

I claim:

1. A dual reel spindle for receiving reels having either of two hole diameters, said spindle comprising a main shaft of small diameter, a retainer means at its free end to hold a reel on the spindle, a bushing of larger diameter slidable on said shaft, a spring mounted on said spindle and urging said bushing toward the retainer means but affording retraction of the bushing when pushed inward by a reel having a small diameter hole, and means to key the reel to the spindle for rotation therewith.

2. A dual reel spindle as defined in claim 1 in which the outer end of the bushing has a projecting pin to key a reel having a small hole, and the inner end of the bushing has a key to key a reel having a larger hole and received on the bushing.

3. A dual reel spindle as defined in claim 1 in which a part of the shaft has a non-circular configuration, and the bushing has a mating non-circular configuration, in order to key the bushing to the shaft.

4. A dual reel spindle as defined in claim 1 in which the outer end of the bushing has a projecting pin to key a reel having a small hole, and the inner end of the bushing has a key to key a reel having a larger hole and received on the bushing, and in which a part of the shaft has a non-circular configuration, and the bushing has a mating non-circular configuration in order to key the bushing to the shaft.

5. A dual reel spindle as defined in claim 1 in which the retainer means is a lever pivoted to turn between an axial position and a transverse position relative to the shaft, and in which the shaft is hollow and carries a spring pressed detent means to hold the lever in either axial position or transverse position.

6. A dual reel spindle as defined in claim 1 in which the main shaft has a diameter dimensioned to receive a reel for standard 8 millimeter motion picture film, and the bushing has a diameter dimensioned to receive a reel for the newer Super 8 millimeter film.

7. A dual reel spindle as defined in claim 1 in which the outer end of the bushing has a projecting pin to key a reel having a small hole, the inner end of the bushing has a key to key a reel having a larger hole, a part of the shaft has a non-circular configuration and the bushing has a mating non-circular configuration in order to key the bushing to the shaft, and in which the retainer means is a lever pivoted to turn between an axial position and a transverse position relative to the shaft, and the shaft is hollow and carries a spring pressed detent means to hold the lever in either axial position or transverse position, and in which the main shaft has a diameter dimensioned to receive a reel for standard 8 millimeter motion picture film, and the bushing has a diameter dimensioned to receive a reel for the newer Super 8 millimeter film.

8. A dual reel spindle as defined in claim 1 in which the means to key the reel to the spindle is a wire extending longitudinally of the spindle at a radius suited to receive the key slot of reels having either of the two different diameter holes.

9. A dual reel spindle as defined in claim 1 in which the means to key the reel to the spindle is a wire extending longitudinally of the spindle at a radius suited to receive the key slot of reels having either of the two different diameter holes, said wire being disposed at a radius just outside the bushing, and said bushing being axially slidable relative to both the wire and the shaft.

References Cited

UNITED STATES PATENTS 3,253,796 5/1966 Jackson ------------ 242—68.3

FRANK J. COHEN, *Primary Examiner.*

N. L. MINTZ, *Assistant Examiner.*